O. H. BASQUIN.
COLUMN.
APPLICATION FILED MAR. 11, 1918.
1,287,613.
Patented Dec. 17, 1918.
2 SHEETS—SHEET 1.
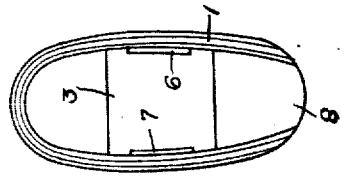
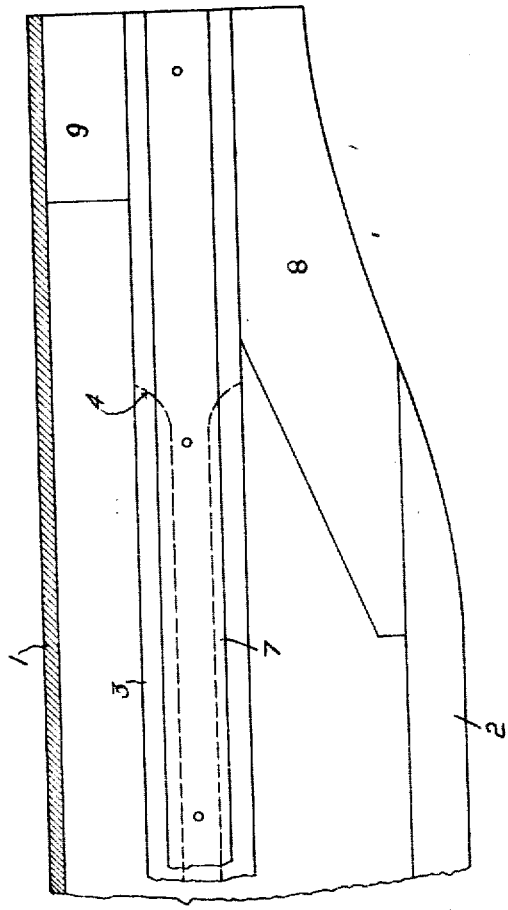
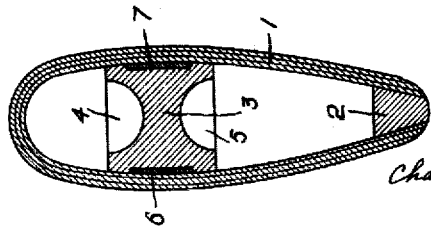
INVENTOR.
O. H. Basquin,
BY
Chamberlin Breudenreich,
ATTORNEYS.

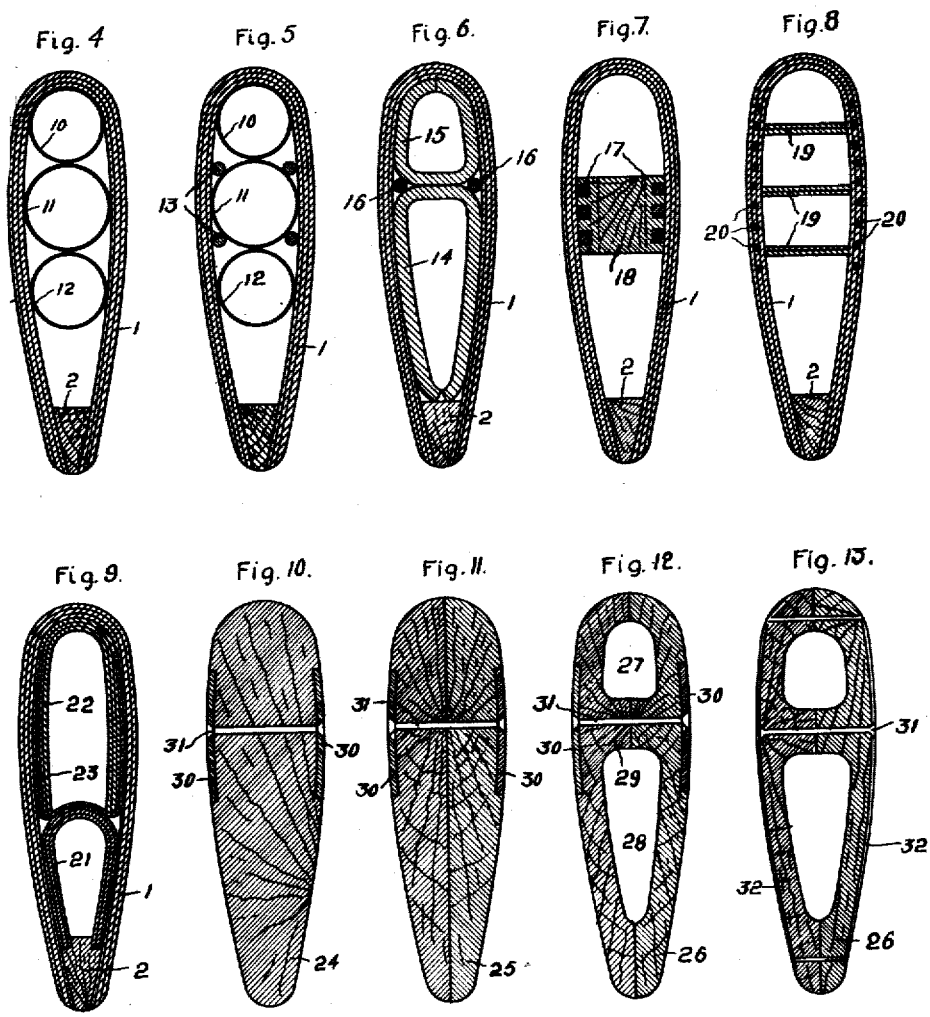

UNITED STATES PATENT OFFICE.

OLIN H. BASQUIN, OF EVANSTON, ILLINOIS, ASSIGNOR TO HASKELITE MANUFACTURING CORPORATION, A CORPORATION OF NEW YORK.

COLUMN.

1,287,613.    Specification of Letters Patent.    Patented Dec. 17, 1918.

Application filed March 11, 1918. Serial No. 221,664.

*To all whom it may concern:*

Be it known that I, OLIN H. BASQUIN, a citizen of the United States, residing at Evanston, county of Cook, State of Illinois, have invented a certain new and useful Improvement in Columns, and declare the following to be a full, clear, and exact description of the same, such as will enable others skilled in the art to which it pertains to make and use the same, reference being had to the accompanying drawings, which form a part of this specification.

My invention relates particularly to the columns that are employed as interplane struts of biplanes or for connecting the landing gear or pontoons with the upper parts of airplanes or in other positions where they are exposed to strong air currents and must therefore be given cross sectional shapes which will reduce to a minimum their resistance to the air, although it will of course be understood that my invention is applicable to other uses; and it has for its object to produce a column combining lightness and strength.

The section that has been found to give the best results and has what is termed a "stream line" outline is one which is more or less oval with the long axis extending from front to rear and the short axis extending transversely. The difficulty that has been experienced with struts of the so-called "stream line" sections arises from the fact that their radii of gyration and therefore their moments of inertia about the long axes of the sections are small. The strength of the column depends, however, upon its moment of inertia about the long axis. The other factor on which the strength of the column depends is the modulus of elasticity of the material of which the column is made, rather than the strength of the material. For a given material, one of these two factors is fixed and therefore the only way in which an increase in strength may be obtained is by increasing the thickness in the direction parallel with the short axis, something which conditions may not permit or which, in any event may be objectionable. Consequently, where the length of the short axis may not be increased, and the weight is fixed, added strength can effectively be obtained only by the addition of some material such that the ratio of its modulus of elasticity to that of the material of the rest of the column is greater than the ratio between the weights of the two materials per unit volume.

The object of the present invention, viewed in one of its aspects, may be said to be a construction of a column and an arrangement of material in the column such as to produce a stronger and better element, for a given weight and cross sectional outline than could be obtained by the use of wood alone.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a transverse section through a column arranged in accordance with one form of my invention;

Fig. 2 is a longitudinal section through one end of the column;

Fig. 3 is an end view of the reduced end of the column shown in Fig. 2; and

Figs. 4 to 13, inclusive, are cross sections, similar to Fig. 1, showing various other forms of my invention.

Reference being had to Figs. 1 to 3, inclusive, 1 represents a shell of veneer, illustrated as being three ply, although any desired number of layers may be employed, which is bent so as to produce the desired stream line contour. Between the free ends of the veneer sheet is placed a rib or strip, 2, to which the veneer is cemented or glued. Within the shell is a filling piece, 3, extending longitudinally thereof in the widest portion measured transversely of the long axis. The member 3 may conveniently be a solid piece or strip of wood hollowed out on the front and rear sides, as indicated at 4 and 5, in the vicinity of the long axis so as to reduce the weight without appreciably reducing the strength of the part. The member 3, which is preferably glued or cemented to the surrounding shell, adds strength to the column and it also serves a useful function in the manufacture of the column by serving as a form upon which the shell is molded and thus accurately determines the thickness of the column. No matter what kind of wood is used in the filler, its modulus of elasticity cannot be much greater than that of the veneer. Furthermore, since all parts thereof are closer to the long axis of the section than those portions of the veneer in the corresponding zone, the member 3 is not so advantageously placed as the corresponding part of the veneer. The modulus of elasticity for steel is about twenty times as great as it is for wood while the ratio between the weight of steel and the weight of wood is only about thirteen. Consequently for a given weight the steel will possess a decided advantage which will be further increased by reason of the fact that the steel, because of its much smaller cross sectional area, may be placed farther from the long axis of the section than a piece of wood of the same weight. I have therefore placed within the shell bars of metal, 6 and 7, which preferably lie within the thickest part of the column and in contact with the inner walls of the shell so as to bring them as far as possible from the long axis of the section. These reinforcing metal members may conveniently be laid in longitudinal grooves or channels in opposite sides of the filling piece 3, which grooves or channels are made of the same cross sectional shapes as the reinforcing members so that the surfaces of these members will be flush with the outer faces or surfaces of the filling piece. The filling piece may therefore be made to serve the additional purpose of properly spacing the metal reinforcing members both relatively to the long axis of the section and relatively to the short axis.

Instead of using steel as the reinforcing material, some of the strong light alloys of aluminum may be employed with about the same results for a given weight of material used. It will of course be understood, however, that any other suitable metal may be employed.

As heretofore explained the parts, 3, 6 and 7 extend the entire length of the column. If it be desired to make the column smaller at the end, this may be accomplished as shown in Fig. 2; a solid filling piece, 8, being inserted between the end of the rib 2 and the filling piece and the veneer being cemented to the member 8. The end of the hollow column may be sealed by inserting a block or plug 9, between the filling piece 3 and the veneer on the opposite side from that on which the member 8 is located.

In the arrangement shown in Fig. 4 the reinforcement comprises a series of metal tubes, 10, 11 and 12, arranged one in front of the other; the veneer shell being molded around them. In Fig. 5 the arrangement is the same as that in Fig. 4 except that there are added a plurality of rods or wires, 13, soldered or otherwise secured to the central larger tube, 11, so as to lie in contact with the inner surface of the veneer. While the section shown in Figs. 4 and 5 may be used to advantage under some conditions, the radii of gyration of the metal reinforcing tubes are small and therefore more weight is required than would be the case if the metal were all disposed farther from the long axis of the section.

In Fig. 6 the interior of the column is filled by means of two small shells, 14 and 15, also made of veneer, and placed back to back. In the small triangular spaces that are formed where the three shells meet, I place reinforcing rods or bars, 16, of metal.

Fig. 7 illustrates a section similar to that shown in Fig. 1 except that instead of the flat bars 6 and 7 I have employed two groups or series of bars or rods, 17, which are conveniently placed in suitable recesses or grooves in the sides of the filling piece, 18, corresponding to the filling piece 3.

In Fig. 8 there is illustrated an arrangement in which there are three parallel partition-like members, 19, extending longitudinally of the column and in planes at right angles to the long axis of the section; the members 19 being preferably made of veneer comprising at least two layers. The metal reinforcement consists of small rods or wires, 20, placed between the inner and outer layer of the shell; the rods or wires being located only in those portions of the shell that are farthest removed from the long axis of the section.

Fig. 9 illustrates a section in which there is a small veneer shell, 21, in the smaller end of the section and a U-shaped member, 22, of veneer in the remainder of the section; the open mouth of the member 22 being directed toward the member 21. The member 22 is embraced by a U-shaped member, 23, made of sheet metal, the yoke portion of which engages the member 21 while the sides or arms lie between the sides or arms of the member 22 and the outer shell 1.

In Figs. 10, 11 and 12 there are illustrated three forms of columns, 24, 25 and 26, made, respectively, of a single piece of solid wood, two pieces of solid wood glued together, and two pieces of solid wood glued together but so fashioned on the sides facing each other as to produce a hollow member containing preferably two chambers, 27 and 28, separated from each other by a cross piece, 29, in the thickest part of the column. These columns are reinforced by means of metal plates, 30, set into the outside faces of the columns and held in place by through bolts or rivets, 31. It will be seen that the metal in these sections is disposed at a maximum distance from the long axis of the section.

In the arrangement shown in Figs. 10 to 12 the metal plates are comparatively narrow and thick. In Fig. 13 I have shown a similar arrangement in which the metal plates, 32, are made quite thin and of great width so as, in effect, to form a sheathing for the column except at the extreme edges.

While my invention is particularly applicable to columns of "stream line" section, it will of course be understood that some of the features of my invention may be used to advantage in columns of other sections. I desire to have it also understood that the metal reinforcement need not in all cases extend the entire length of the column as it may sometimes be unnecessary to employ metal reinforcement except in a part only of a column as, for example, the middle part. I desire to have it understood, also, that the metal reinforcement is not necessarily of uniform cross sectional area throughout the length thereof; because the conditions which will permit the omission of the reinforcing metal entirely at some points in the length of a column will naturally make it possible to employ a smaller cross sectional area of metal at some points than at others.

I claim:

1. A column comprising a shell of laminated veneer shaped in cross section so as to have a long axis and a short axis transverse to each other, a filling piece extending longitudinally through the column and fitting against the inner surfaces thereof in the vicinity of the short axis, and longitudinal reinforcing members of metal extending through the column in the vicinity of the planes of contact between the filling piece and the surrounding veneer.

2. A column comprising a shell of laminated veneer shaped in cross section so as to have a long axis and a short axis transverse to each other, a filling piece extending longitudinally through the column and fitting against the opposed inner surfaces thereof in the vicinity of the short axis, the thickness of said filling piece measured in the direction of said long axis being less than the length of said long axis, and longitudinal metal reinforcing members extending through the column at points remote from the said long axis and in the transverse zone corresponding to the location of the filling piece.

3. A column comprising a shell of wood shaped in cross section so as to have a long axis and a short axis transverse to each other, a filling piece of wood extending longitudinally through the column and fitting against the inner surfaces thereof in the vicinity of the short axis, and longitudinal metal reinforcing members extending through the column at points remote from the long axis and in the transverse zone corresponding to the location of the filling piece.

4. A column comprising a longitudinal wood filling piece having longitudinal grooves in two opposite sides, longitudinal reinforcing members of metal lying in said grooves, and a shell of veneer bent over said filling piece and shaped so as to engage with the sides of the latter in which the metal reinforcing members lie and be out of contact with the other two sides of the filling piece.

5. A column comprising a longitudinal filling piece of wood having longitudinal grooves in opposite sides, longitudinal reinforcing members of metal lying in said grooves, a shell bent over said filling piece and so shaped in cross section as to have a long axis and a short axis transverse to each other, the relative cross sectional shapes of the shell and the filling piece being such that the shell and the filling piece engage with each other at the ends of said short axis and are out of contact with each other toward the ends of said long axis.

6. A column comprising a longitudinal filling piece having grooves in opposite sides thereof, longitudinal metal reinforcing members arranged in said grooves, and a shell bent over said filling piece and engaging therewith throughout the areas containing the metal reinforcing members.

7. A column comprising a longitudinal filling piece of wood approximately square in cross section and having longitudinal grooves in two opposed sides, longitudinal metal reinforcing members lying in said grooves, and a shell bent around said filling piece and contacting with the grooved sides of the latter, said shell being so shaped that it has an axis extending at right angles to the other two sides of the filling piece considerably longer than the transverse axis.

8. A column comprising a longitudinal filling piece of wood approximately square in cross section and having longitudinal grooves in two opposed sides, longitudinal metal reinforcing members lying in said grooves, and a shell bent around said filling piece and contacting with the grooved sides of the latter, said shell being so shaped that it has an axis extending at right angles to the other two sides of the filling piece considerably longer than the transverse axis, and the two remaining sides of the filling piece being recessed in such a manner as to lighten the filling piece without decreasing the width of the grooved sides.

In testimony whereof, I sign this specification.

OLIN H. BASQUIN.